United States Patent [19]

Kano

[11] Patent Number: 5,478,976

[45] Date of Patent: Dec. 26, 1995

[54] INFORMATION PROCESSING METHOD AND APPARATUS

[75] Inventor: Atsushi Kano, Yokohama, Japan

[73] Assignee: Canon Kabushiki Kaisha, Tokyo, Japan

[21] Appl. No.: 466,331

[22] Filed: Jun. 6, 1995

Related U.S. Application Data

[63] Continuation of Ser. No. 113,190, Aug. 30, 1993, abandoned.

[30] Foreign Application Priority Data

Aug. 31, 1992 [JP] Japan .................................. 4-232349
Dec. 28, 1992 [JP] Japan .................................. 4-361623

[51] Int. Cl.6 .............................. G08C 21/00; G09G 5/00
[52] U.S. Cl. ............................................. 178/19; 345/179
[58] Field of Search ........................ 178/18, 19; 345/179

[56] References Cited

U.S. PATENT DOCUMENTS 4,658,509  4/1987  Juengel ................................. 33/558
4,777,329  10/1988  Mallicoat ............................. 178/18
4,814,552  3/1989  Stefik et al. ......................... 178/18
5,007,085  4/1991  Greanias et al. .................... 345/180
5,228,072  7/1993  Ingalsbe et al. ...................... 379/29
5,294,792  3/1994  Lewis et al. ......................... 345/180

Primary Examiner—Stephen Chin
Assistant Examiner—Kevin Kim
Attorney, Agent, or Firm—Fitzpatrick, Cella, Harper & Scinto

[57] ABSTRACT

An information processing apparatus includes a code transmitter unit and a code receiver unit. The code transmitter unit includes a memory for storing a code string, a trigger generator for generating a trigger signal, a generation section for generating an identification code string by reading out the code string in response to the trigger signal generated by the trigger generator, and a transmitter for transmitting the identification code string generated by the generation section. The code receiver unit includes a receiver for receiving a signal, and an extraction section for extracting the identification code string from the signal received by the receiver, and storing the extracted identification code string.

12 Claims, 10 Drawing Sheets

FIG. 2

| REMAINING BATTERY ENERGY | | BIT PATTERN | |
|---|---|---|---|
| | EXCELLENT | 0 | 0 |
| | GOOD | 0 | 1 |
| | FAIRLY GOOD | 1 | 0 |
| | POOR | 1 | 1 |

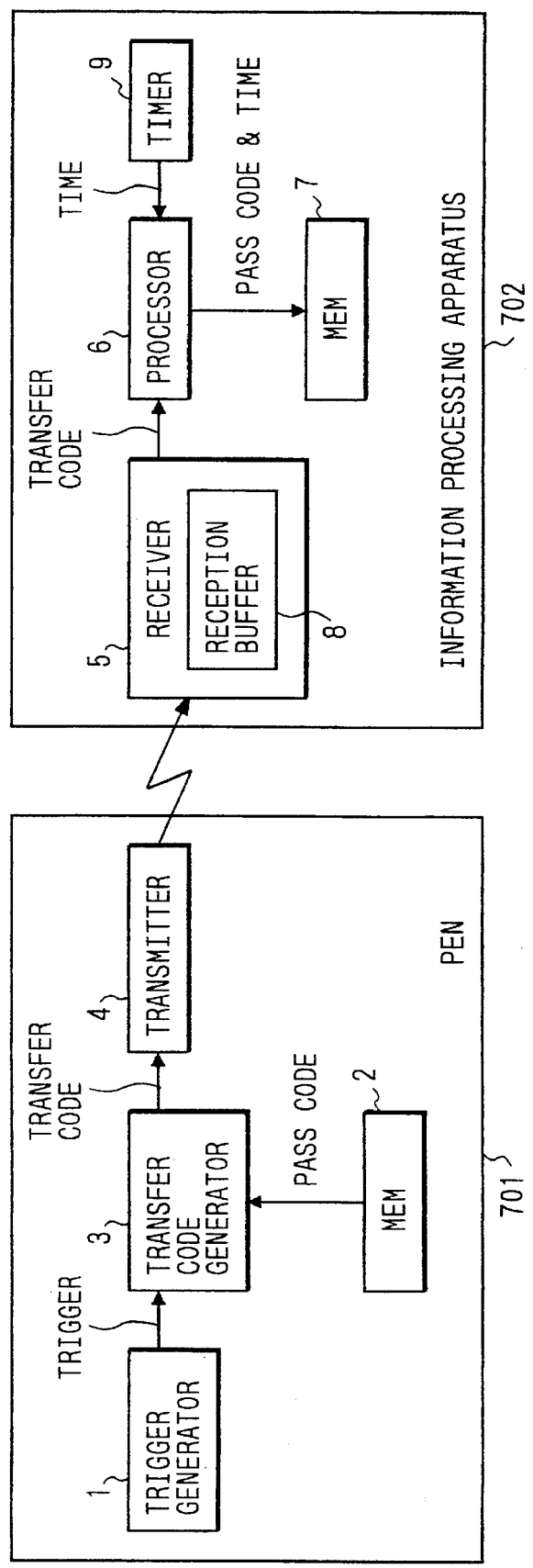

INFORMATION PROCESSING METHOD AND APPARATUS

This application is a continuation of application Ser. No. 08/133,190 filed Aug. 30, 1993, now abandoned.

BACKGROUND OF THE INVENTION

1 Field of the Invention

The present invention relates to an information processing method and apparatus having a compact input device such as a pen type input device.

2. Related Background Art

Conventionally, an apparatus using a battery as a power supply has a function of preventing abrupt interruption of the use of the apparatus due to an insufficient battery voltage by informing the remaining battery energy amount of the power supply battery. The information of the remaining battery energy amount is realized by changing an ON pattern of LEDs, provided to the apparatus using the battery, in accordance with the remaining battery energy amount, or displaying a message or a mark on a display device of the apparatus using the battery.

However, in order to inform the remaining battery energy amount, LEDs or a display device is necessary, and such LEDs or a display device is normally assembled only in a relatively large-scale apparatus.

However, a computer apparatus having a compact input device such as a pen input device as an input unit has no device for informing the remaining battery energy amount of a power supply battery arranged in the input unit. For this reason, a user cannot know a decrease in battery energy amount until the battery is used up. Therefore, the battery energy is abruptly cut off, resulting in inconvenience for the user.

When the remaining battery energy amount is to be displayed using the above-mentioned technique, the device itself becomes large in size. When the above-mentioned technique is applied to a pen input device which is normally held by hand in use, the pen input device is not easy to use.

Conventionally, an information processing apparatus such as a computer is normally equipped with a keyboard or an equivalent input device. When such information processing apparatuses are used in, e.g., an office, they are exclusively used by individual users, or they are distributed to users when the users come in the office, and are recovered when the users leave the office, i.e., they are semi-exclusively used by the individual users. In the former case, each user stores his or her own information in the information processing apparatus, and must protect such information from other users. In the latter case, if a user uses different information processing apparatuses day by day, he or she must be able to easily acquire his or her own information from, e.g., a center computer using the information processing apparatus.

In such a system, a method of specifying a user by inputting a password such as an alphabet character string inherent to each user in the information processing apparatus so as to identify each user is popularly used.

When an information processing apparatus which does not comprise a keyboard is utilized, a virtual keyboard is displayed on the screen in place of the keyboard, and a name or password is input via the virtual keyboard using a hand-writing input device so as to specify a user.

An information processing apparatus comprising a hand-writing input device is easy to use for a beginner since no keyboard is equipped. However, when a name or password is input using the hand-writing information processing apparatus, the virtual keyboard must be displayed to urge a user to be conscious of the keyboard, and one of merits of the apparatus which comprises no keyboard, i.e., to exclude specialty of a keyboard, is lost. Hand-writing character input may be undesirably watched by a third party, and may be erroneously recognized by the apparatus, resulting in troublesome operations. Thus, hand-writing character input lacks safety, stability, and convenience.

Furthermore, an information processing apparatus such as a recent compact personal computer normally has a resume function. With this function, a state upon completion of a certain process can be held, and when the power supply switch is turned on again, the previous state upon completion of the process can be resumed, This function makes the apparatus easy to use. In this case, the reboot operation of the power supply is also processed as continuation of the previous process. Unless a new operator is identified by inputting, e.g., a password, the information processing apparatus can be continuously used by everyone even if an exclusive user is absent, thus posing a problem of data security.

SUMMARY OF THE INVENTION

The present invention has been made in consideration of the above situation, and has as its object to provide a computer apparatus, which can eliminate inconvenience caused by an abrupt battery down state, and can improve user's convenience with low cost.

According to the present invention, the remaining battery energy amount of a power supply battery arranged in an input unit is detected, the battery energy state is discriminated in accordance with the detected remaining battery energy amount, the discriminated battery energy state is converted into a predetermined bit string, the bit string is converted into a predetermined signal, and the signal is transmitted. Therefore, inconvenience caused by an abrupt battery down state can be eliminated, and user's convenience can be improved with low cost.

Since a beginner is not accustomed with, e.g., a password input operation, it is preferable that such an operation is excluded as much as possible, or a computer is capable of operation without urging a user to be conscious of such an operation.

The present invention has been made in consideration of the prior art, and has as its another object to provide an information processing apparatus, which can easily specify a user, is easy for a user to operate, and can always transmit identification information of an operator in use.

According to the present invention, a user can be easily specified, the apparatus is easy for a user to operate, and identification information of an operator can always be transmitted in use.

BRIEF DESCRIPTION OF THE DRAWINGS

FIG. 2 is a table showing the relationship between the remaining battery energy amount state of a power supply battery and a bit pattern;

FIG. 7 is a block diagram showing a hand-writing input type information processing apparatus according to the second embodiment;

DESCRIPTION OF THE PREFERRED EMBODIMENTS

<First Embodiment>

The preferred embodiment of the present invention will be described in detail hereinafter with reference to the accompanying drawings.

Figure 1:
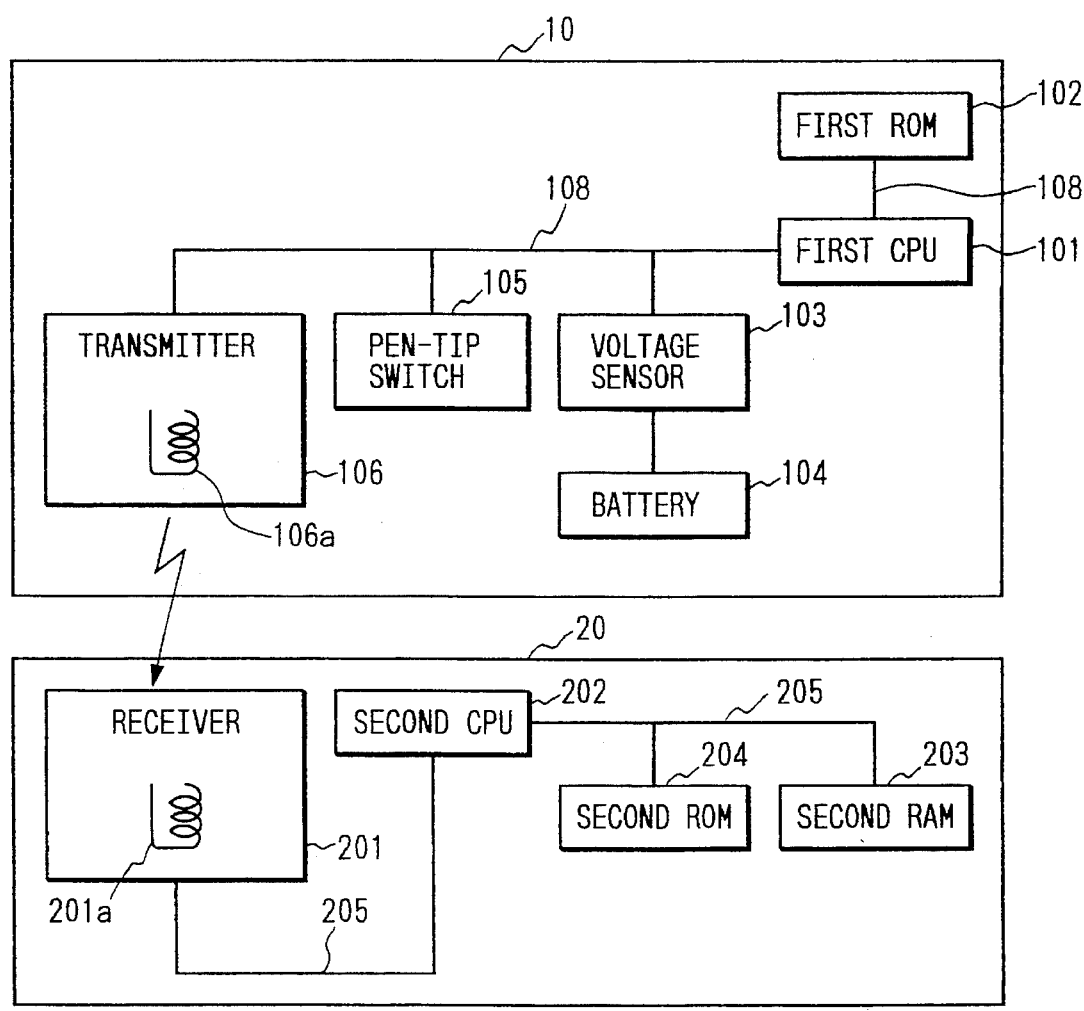
FIG. 1 is a block diagram showing a schematic arrangement of a computer apparatus according to the first embodiment.

FIG. 1 is a block diagram showing a schematic arrangement of a computer apparatus according to an embodiment of the present invention. The computer apparatus comprises a pen input unit 10 and an apparatus main body 20.

Referring to FIG. 1, the pen input unit 10 comprises a first CPU (discrimination means, bit string conversion means) 101 for executing a calculation, decision, and process, a first ROM 102 for storing a bit pattern (bit string), the process sequence of the first CPU 101, and the like, a voltage sensor (detection means) 103 for detecting a power supply state, a power supply battery 104 for supplying a power supply voltage to the respective sections of the pen input unit 10, a pen-tip switch 105 provided at a pen tip, a transmitter 106 which has a transmission coil 106a for generating a magnetic signal, and which converts a bit pattern converted according to the power supply state by the first CPU 101 into a magnetic signal, and transmits the magnetic signal, and a system bus 108 for connecting the first CPU 101, and its peripheral sections.

On the other hand, the apparatus main body comprises a receiver 201 which has a receiving coil 201a for receiving the magnetic signal from the transmission coil 106a, and which converts the received magnetic signal into a bit pattern, a second CPU (second discrimination means) 202 for executing a calculation, decision, and process such as discrimination of the remaining battery energy amount of the pen input unit 10 on the basis of the converted bit pattern, a second RAM (storage means) 203 for storing information of the remaining battery energy amount of the power supply battery 104, the calculation result of the second CPU 202, and the like, a second ROM 204 for storing the process sequence of the second CPU 202, data, and the like, and a system bus 205 for connecting the second CPU 202 and its peripheral sections.

The voltage sensor 103 detects the remaining battery energy amount of the power supply battery 104 arranged in the pen input unit 10 on the basis of the output voltage value of the power supply battery 104, and the first CPU (discrimination means) 101 classifies the state of the battery energy in one of a plurality of levels (e.g., "5, 4.9, 4.8, . . . [V]" or "excellent, good, fairly good"). The first CPU (bit string conversion means) 101 forms a bit pattern including information of the state of the pen input unit 10 (e.g., a tap state) from a plurality of bit patterns pre-stored in the first ROM 102 in correspondence with the classified level, and sends the bit pattern to the apparatus main body 20 via the transmitter 106.

The sent signal is received by the receiver 201 arranged in the apparatus main body 20, and is converted into a bit pattern. The converted bit pattern is supplied to the second CPU 202, and the battery energy state of the pen input unit 10 is discriminated.

Information of the discriminated remaining battery energy amount of the power supply battery 104 is stored in the second RAM 203, and is utilized in a program process for informing the battery energy state of the pen input unit 10, e.g., a program process for changing a pen trace color.

FIG. 2 shows the relationship between the remaining battery energy amount state of the power supply battery 104 in FIG. 1 and a bit pattern.

In this embodiment, the initial power supply voltage is set to be 5 V, and a voltage value equal to or higher than 4.4 V is determined as a voltage which can assure a normal operation. Based on this voltage value, the remaining battery energy amount state of the power supply battery 104 is discriminated in four levels, i.e., in the order of "excellent", "good", "fairly good", and "poor". The four levels are set as follows. That is, when the voltage value is 4.9 V or higher, the "excellent" level is determined; when the voltage value is lower than 4.9 V and is equal to or higher than 4.7 V the "good" level is determined; when the voltage value is lower than 4.7 V and is equal to or higher than 4.4 V, the "fairly good" level is determined; and when the voltage value is lower than 4.4 V, the "poor" level is determined.

A bit pattern corresponding to each of these "excellent", "good", "fairly good", and "poor" levels has a 2-bit width, and is set, as shown in FIG. 2. The bit patterns are pre-stored in the first ROM 102, and a corresponding pattern is read out in accordance with the "excellent", "good", "fairly good", or "poor" discrimination result of the first CPU 101.

Figure 3:
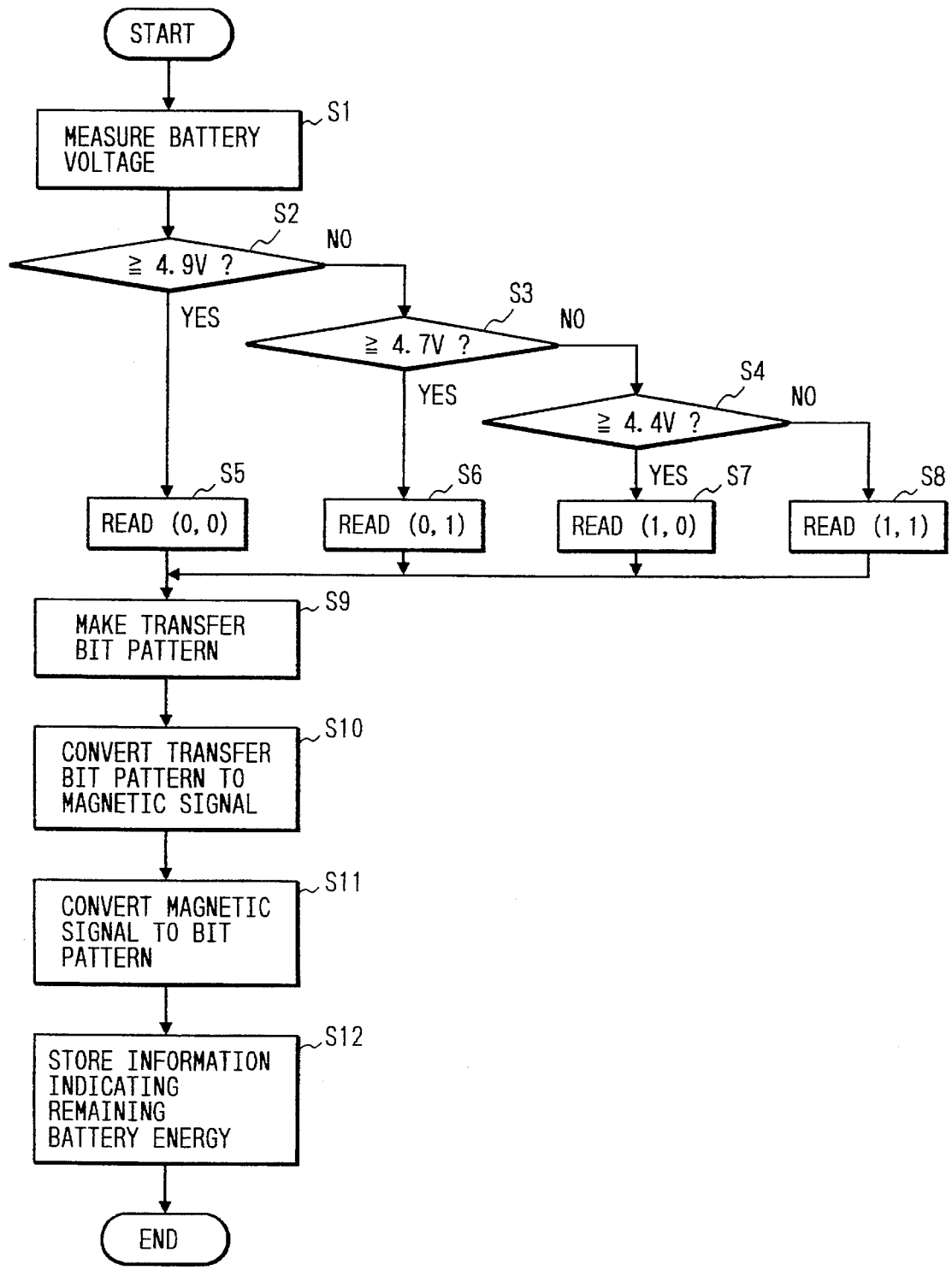
FIG. 3 is a flow chart showing a control operation of the apparatus shown in FIG. 1.

FIG. 3 is a flow chart showing the control operation of the apparatus of this embodiment.

In step S1, the first CPU 101 reads an output voltage value of the power supply battery 104 detected by the voltage sensor 103. In this embodiment, the remaining battery energy amount is measured using the output voltage value of the power supply battery 104, but may be measured using a method of accumulating electric amounts. In steps 2 to 4, the flow branches to four way process modes ("excellent", "good", "fairly good", and "poor") in accordance with the measured voltage value. More specifically, if it is determined in step 2 that the measured voltage value is equal to or higher than 4.9 V, the flow advances to step S5; if the measured voltage value is lower than 4.9 V, the flow advances to step 3. If it is determined in step S3 that the measured voltage value is equal to or higher than 4.7 V, the flow advances to step S6; if the measured voltage value is lower than 4.7 V, the flow advances to step S4. If it is determined in step S4 that the measured voltage value is equal to or higher than 4.4 V, the flow advances to step Si; if the measured voltage value is lower than 4.4 V, the flow advances to step S8.

In this manner, when one of the "excellent", "good", "fairly good" and "poor" levels is determined, in accordance with the power supply voltage value, the flow advances to a corresponding one of steps S5, S6, Si, and S8. If the "excellent" level is determined, a bit pattern (0, 0) corresponding to the "excellent" level is read out from the first ROM 102. In steps S6, Si, and S8, bit patterns corresponding to the "good", "fairly good", and "poor" levels are similarly read out. In step S9, a transfer bit pattern shown in FIG. 4 is formed on the basis of a bit pattern including another information and the bit pattern read out according to the power supply voltage value.

Figure 4:
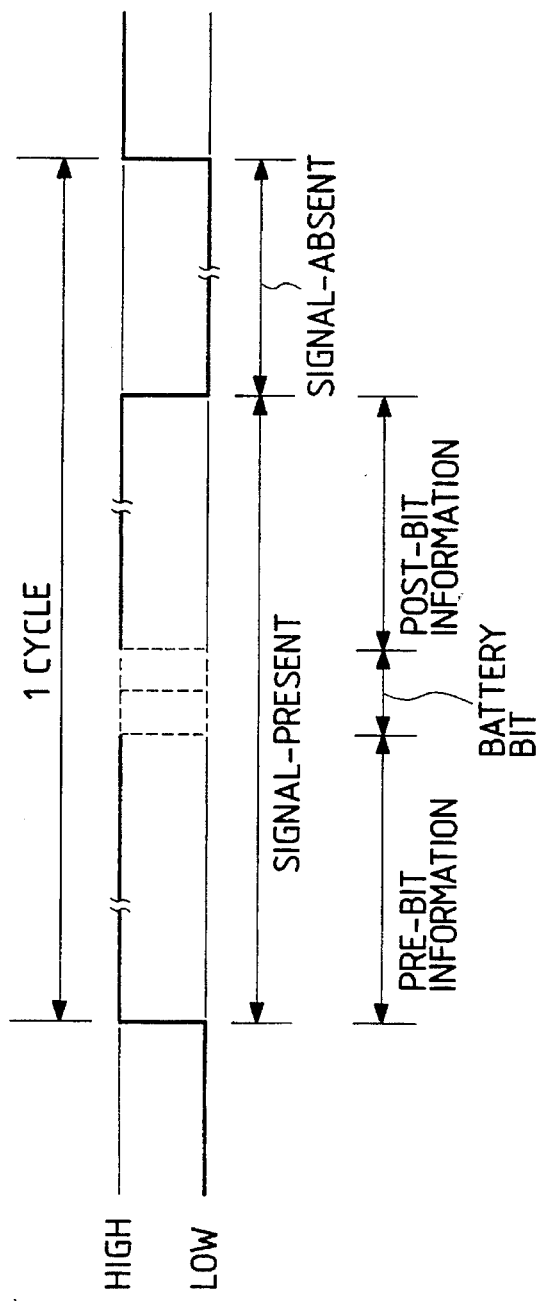
FIG. 4 is a chart showing the format of a transfer bit pattern formed by a first CPU shown in FIG. 1.

FIG. 4 shows the format of the transfer bit pattern formed by the first CPU 101. This bit pattern consists of a signal-present portion and a signal-absent portion, as shown in FIG. 4, and a combination of the signal-present portion and the signal-absent portion is defined as one cycle. The bit pattern of one cycle is repetitively sent several times per second from the first CPU 101 to the transmitter 106.

Figure 5:
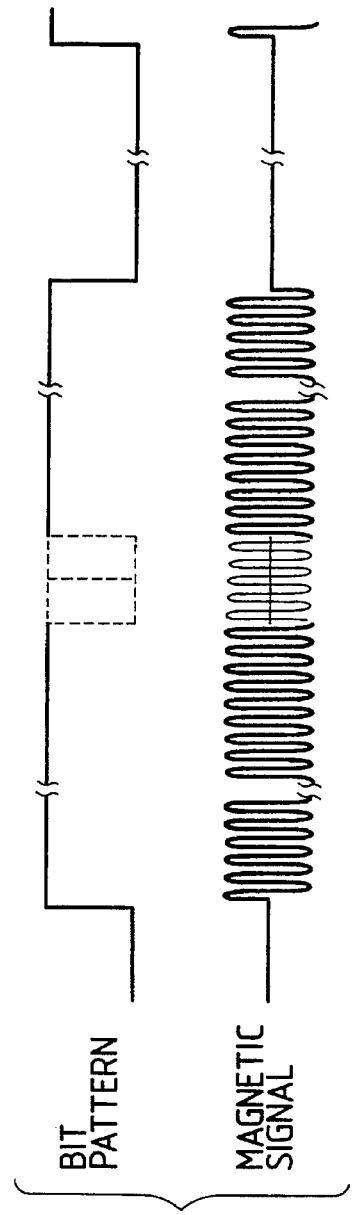
FIG. 5 is a chart showing the relationship between the bit pattern shown in FIG. 4 and a magnetic signal.

The transfer bit pattern sent to the transmitter 106 is converted into a magnetic signal shown in FIG. 5 in step S10, and the magnetic signal is transmitted to the receiver 201 of the apparatus main body 20. Note that FIG. 5 shows the relationship between the bit pattern shown in FIG. 4, and the magnetic signal converted by the transmitter 106, and the frequency and the like of the magnetic signal are different from those of an actual apparatus for the sake of convenience.

In step S11, the sent magnetic signal is received by the receiving coil 201a arranged in the receiver 201, and is converted again into the bit pattern shown in FIG. 4 in the receiver 201. In step S12, the second CPU 202 extracts information of the remaining battery energy amount from the signal-present portion of the converted bit pattern, and stores the extracted information of the remaining battery energy amount in its internal register or the second RAM 203, thus ending this control operation. The information of the remaining battery energy amount stored in the second RAM 203 is utilized in a remaining battery energy information program.

Figure 6B:
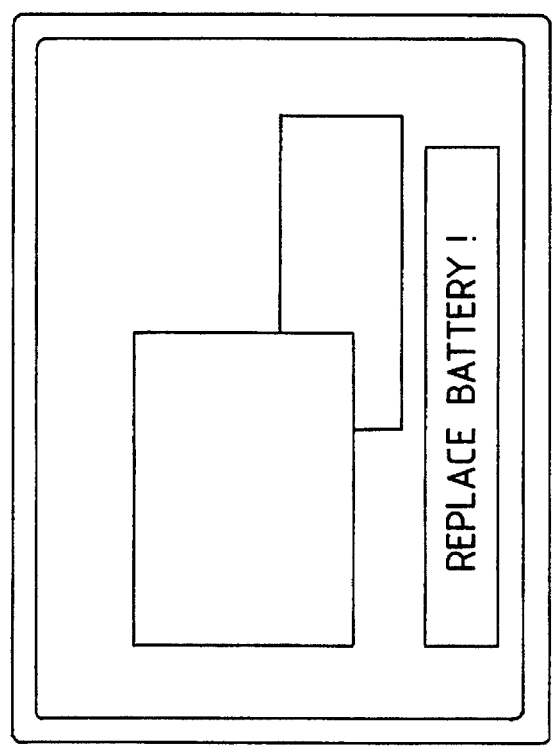
FIGS. 6A and 6B are views showing display screen images of execution results of a remaining battery energy information program processed by a second CPU shown in FIG. 1.
Figure 6A:
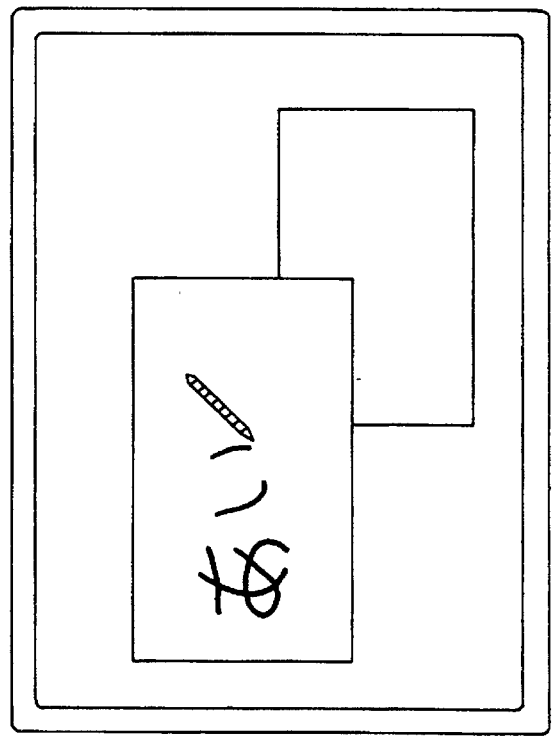

As the information program process, for example, the color of a pen moving trace may be changed (FIG. 6A), or a message indicating a drop in pen battery power may be displayed (FIG. 6B). Alternatively, the thickness of the pen moving trace may be changed.

<Second Embodiment>

FIG. 7 is a block diagram for schematically explaining a hand-writing input type information processing apparatus according to the second embodiment of the present invention. The hand-writing input type information processing apparatus of this embodiment automatically inputs a pass code inherent to a pen to the information processing apparatus when a hand-writing input operation is performed using an input pen, thereby identifying a user.

Referring to FIG. 7, a pen device 701 comprises a trigger generator 1 as trigger signal generation means, a memory 2 as a pass code memory, a transfer code generator 3 for generating a transfer code based on a pass code, and a transmitter 4 as radio transmission means. An information processing apparatus main body 702 comprises a receiver 5 as radio reception means, a processor 6 for extracting a pass code from the received transfer code, a memory 7 for storing the pass code if necessary, a reception buffer 8 arranged in the receiver 5, and a timer 9 for measuring the current time.

In this embodiment, when a trigger signal generated by the trigger generator 1 is supplied to the transfer code generator 3, the transfer code generator 3 reads out a transfer code from the memory 2, and sends it to the transmitter 4. The transmitter 4 converts the transfer code into a radio wave signal, and transmits the converted signal. In this embodiment, a radio wave signal is used as a radio medium.

The transmitted transfer code is received by the receiver 5 arranged in the information processing apparatus main body 702, and is temporarily stored in the reception buffer 8. Thereafter, the transfer code is supplied to the processor 6. The processor 6 extracts a pass code from the received transfer code, and stores it in the memory 7. In this embodiment, the time acquired from the timer 9 is stored at the same time.

Figure 8:
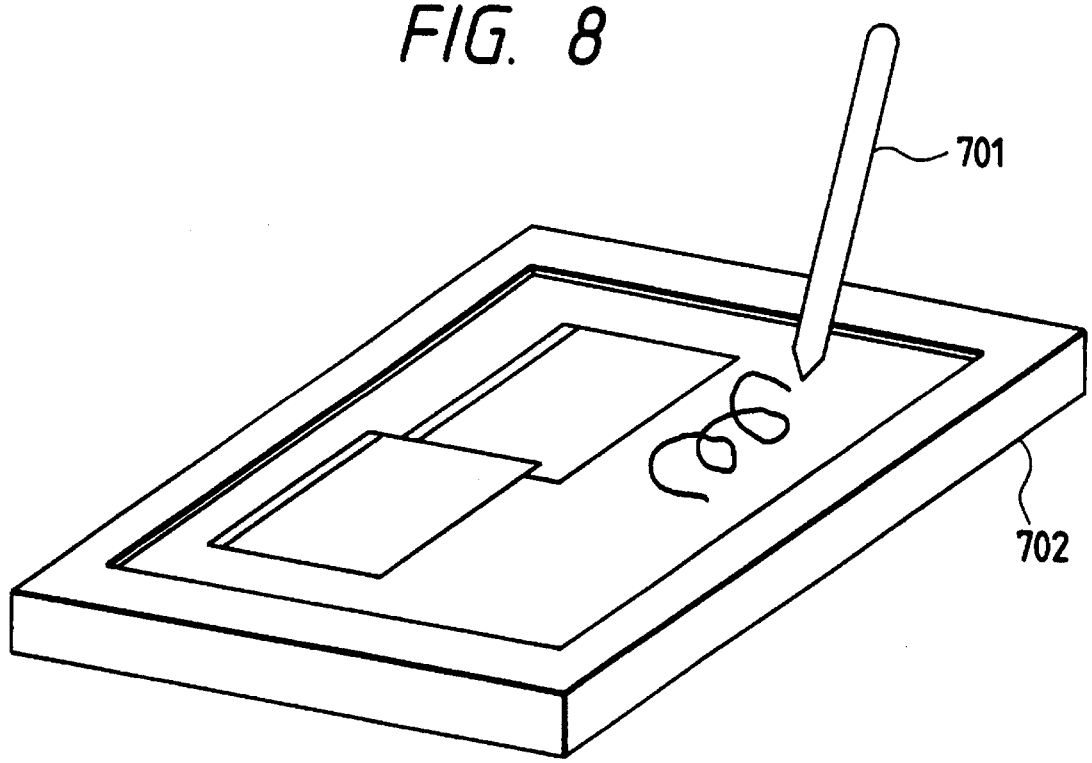
FIG. 8 is a perspective view showing the outer appearance of the hand-writing input type information processing apparatus according to the second embodiment.

FIG. 8 is a perspective view showing the general outer appearance of a hand-writing input type computer apparatus. A proper pattern is drawn on the input screen using the pen device 701, and is input to the information processing apparatus main body 702.

Figure 9:
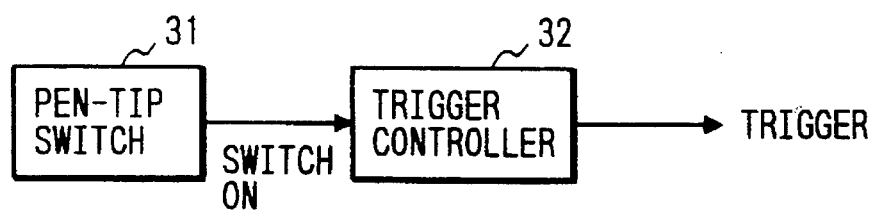
FIG. 9 is a block diagram of a trigger generator.
Figure 10:
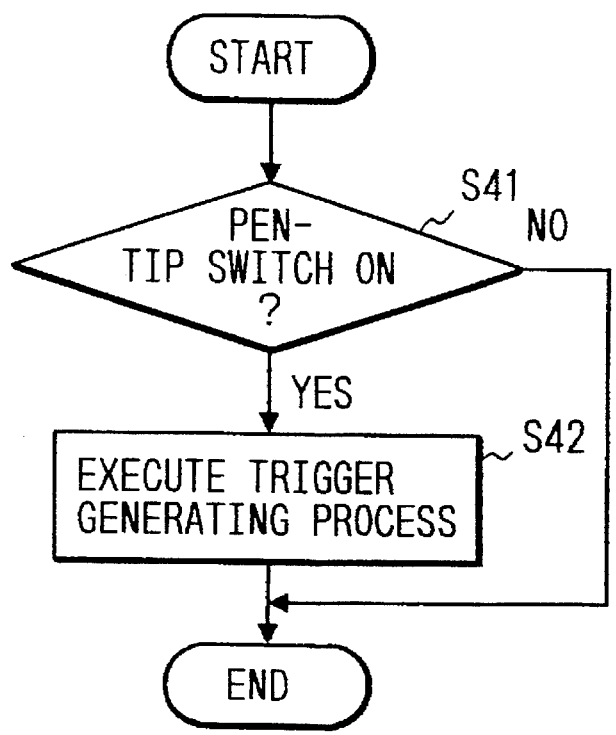
FIG. 10 is a flow chart showing trigger generation.

FIG. 9 shows internal blocks of the trigger generator 1. Referring to FIG. 9, the trigger generator 1 comprises a pen-tip switch 31 for generating a signal when a switch arranged at a pen tip is depressed, and a trigger controller 32 for generating a trigger signal upon reception of the signal from the pen-tip switch 31. In this embodiment, the pen device having the pen-tip switch for, when the pen touches the input screen, detecting this is used, and the pen-tip switch is used for generating a trigger signal. The process flow in the trigger generator 1 will be described below with reference to FIG. 10.

It is checked in step 41 if the pen-tip switch is ON. If YES in step 41, a trigger generating process is executed in step 42. However, if NO in step S41, the trigger generating process is not executed. The pen device repeats the series of processes. More specifically, the pen device generates a trigger signal every time the pen-tip switch is turned on.

Figure 11:
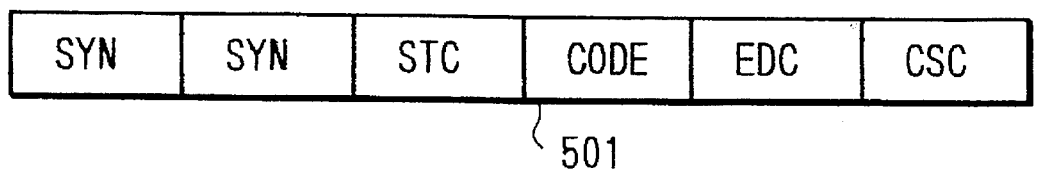
FIG. 11 is a view showing the format of a transfer code.

When the generated trigger signal is supplied to the transfer code generator 3, the transfer code generator 3 reads out a transfer code 501 shown in FIG. 11 from a ROM. Referring to FIG. 11, "SYN" indicates a synchronization header code, "STC" indicates a code representing the start of a pass code, "CODE" indicates the pass code, "EDC" indicates a code representing the end of the pass code, and "CSC" indicates an error detection code. Upon generation of the transfer code, the pass code alone may be stored in the memory 2, and after the pass code is read out, control codes, and the like may be added to the pass code. However, in this embodiment, the transfer code 501 obtained by combining the pass code, communication control codes, and the like in advance is stored in a ROM constituting the memory 2. The transfer code is fixed upon manufacture of the input pen device 701. The transfer code may be stored in a RAM by means for, e.g., preserving data by an internal battery.

The transfer code generated by the transfer code generator 3 is supplied to the transmitter 4, and is transmitted as a radio wave signal. In this embodiment, the radio signal is transmitted in a unidirectional communication. Therefore, immediately after the trigger signal is generated, the pen device 701 transmits the transfer code.

Figure 12:
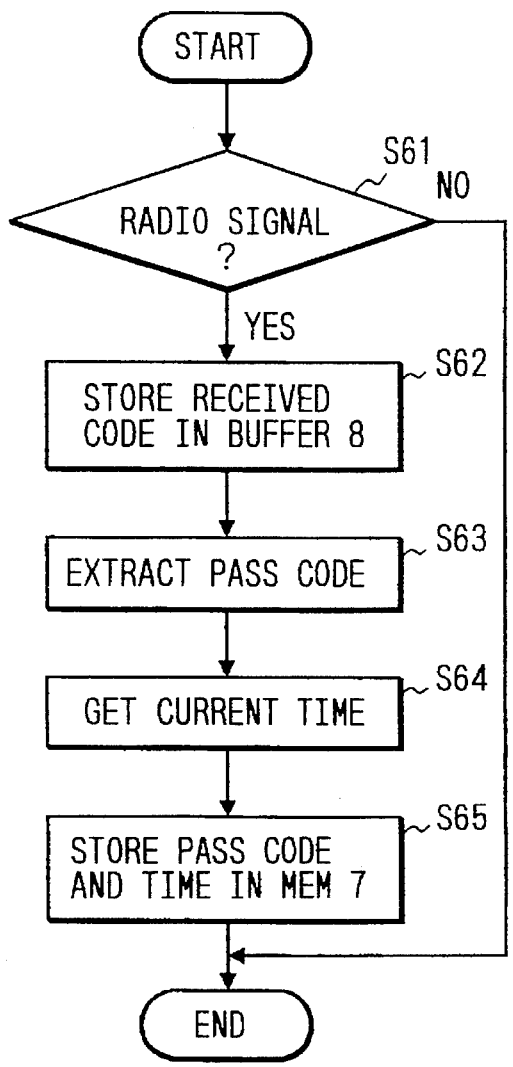
FIG. 12 is a flow chart showing a process in a receiving computer.

The transmitted transfer code is received by the receiver 5 equipped in the information processing apparatus 702 neighboring the pen device 701. The transfer code received by the receiver 5 of the information processing apparatus 702 is temporarily stored in the reception buffer 8. Thereafter, the transfer code is sent to the processor 6. The processor 6 extracts the pass code from the sent transfer code, and stores the extracted pass code in the memory 7 together with a time acquired from the timer 9. FIG. 12 shows the flow of this reception process.

When the reception signal is detected in step S61, the received code 501 is stored in the reception buffer 8 arranged in the receiver 5 in step S62, the pass code is extracted in step S63, the current time is acquired from the timer 9 in step S64, and the pass code is stored in the memory 7 together with the time in step S65.

The pass code stored in the memory 7 is freely accessed by application software programs of the information processing apparatus 702, and is utilized to, e.g., identify a user. For example, when the information processing apparatus 702 is connected to, e.g., a host computer, and data is to be acquired from the host computer, if an application program for achieving this operation is started, the program refers to the pass code to check a user, and thereafter, a process for acquiring data is started. Alternatively, the pass code itself may be sent to the host computer to be checked by the host computer. In this manner, the application programs can freely access the pass code.

The time is used for indicating "freshness" of the pass code stored in the memory 7, i.e., is used for determining the time elapsed since the stored pass code was received. If the application software program or the like of the information processing apparatus 702 refers to and clears the memory 7 every time a new pass code is input from the pen, the time need not be referred to.

As described above, since the pass code is automatically input from the special-purpose pen, the hand-writing input type information processing device using the pen device can easily specify a user from, e.g., an application software program, and even a beginner can use the information processing apparatus without being conscious of the password.

Unlike the case of only once input of user identification information limited to the beginning of use, a user can always be monitored during use of the apparatus. For this reason, even when the resume function operates or when a user leaves the apparatus, information can be protected. Also, even when the information processing apparatus is alternately used by a large number of users, a user record can be saved. Therefore, the present invention is very effective for information protection and access management of users in the hand-writing input type information processing apparatus using the pen device.

As a modification of this embodiment, a hand-writing input type information processing apparatus in which the trigger generator 1 in the pen device 701 has a different arrangement from that of the above embodiment will be described below.

Figure 13:
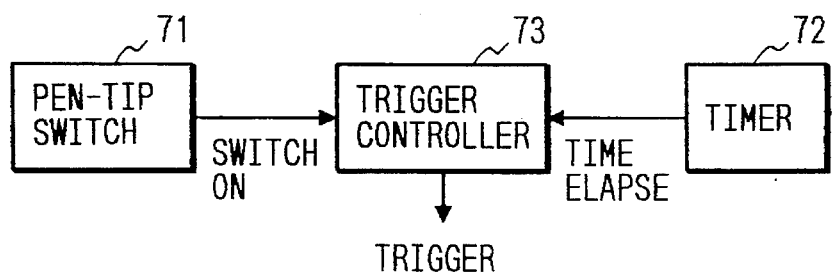
FIG. 13 is a block diagram of another trigger generator.

FIG. 13 shows another embodiment of the trigger generator 1. Referring to FIG. 13, the trigger generator 1 comprises a pen-tip switch 71 indicating an ON state of a switch provided to a pen tip, a timer 72 for measuring a time interval T, and a trigger controller 73 for conditionally generating a trigger upon reception of the signal from the pen-tip switch 71 and the timer 72.

The timer 72 is arranged to suppress the number of times of transmission of a transfer code from the pen device 701, and to assure a certain frequency. This aims at reducing the transmission power consumption amount and the reception process amount.

In this embodiment, when a trigger signal generated by the trigger generator 1 is sent to the transfer code generator 3, the transfer code generator 3 reads out a transfer code from the memory 2, and sends it to the transmitter 4. The transmitter 4 converts the transfer code into a radio wave signal, and transmits the radio wave signal. Note that in this embodiment, a radio wave signal is used as a radio medium.

The transmitted transfer code is received by the receiver 5 arranged in the information processing apparatus main body 702, and is temporarily stored in the reception buffer 8. Thereafter, the transfer code is supplied to the processor 6. The processor 6 extracts a pass code from the received transfer code, and stores it in the memory 7 together with a time acquired from the timer 9.

In this embodiment, the pen device having the pen-tip switch 71 for, when the pen touches the input screen, detecting this is used, and the pen-tip switch and the timer 72 are used for generating a trigger signal.

Figure 14:
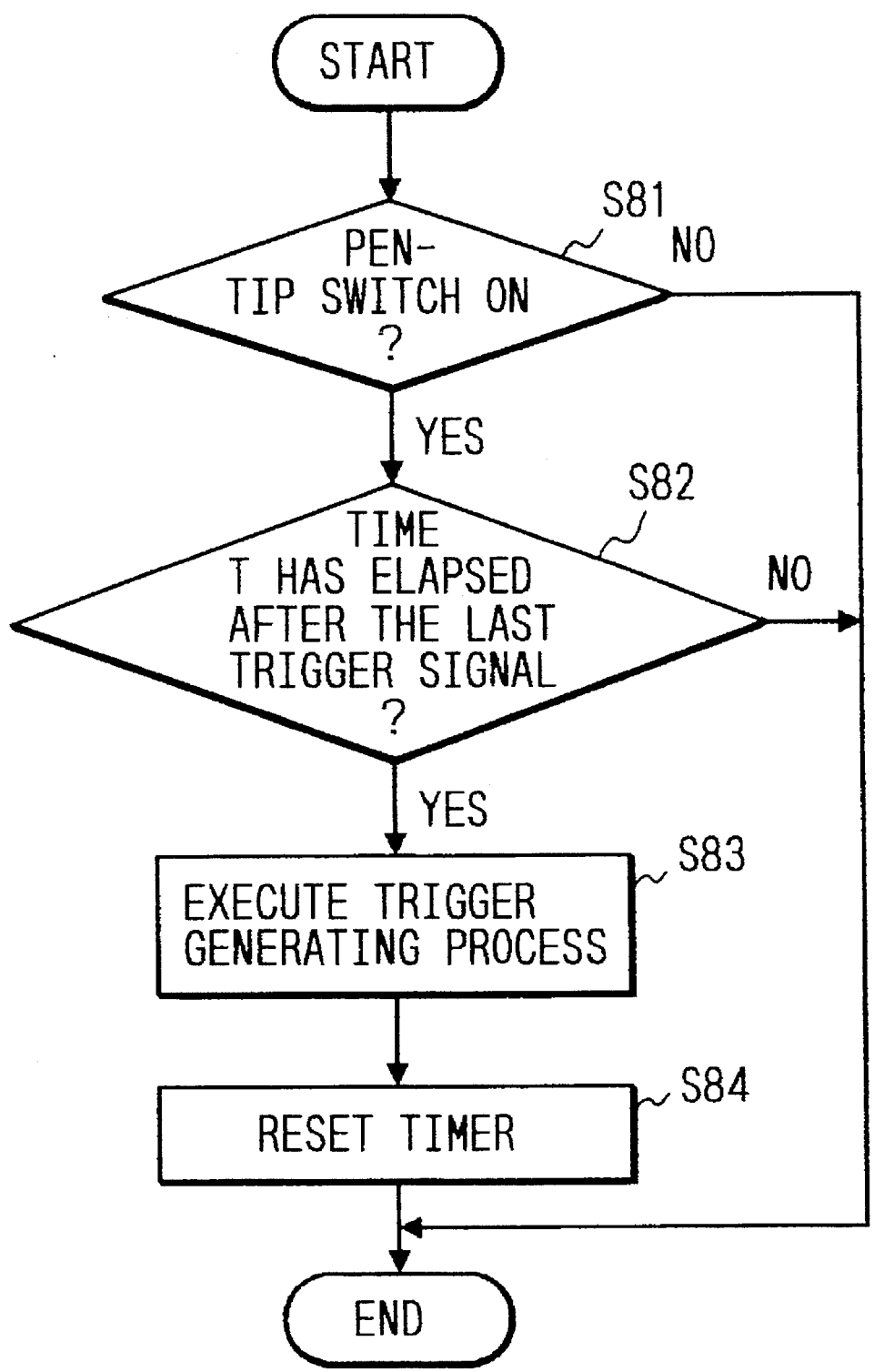
FIG. 14 is a flow chart showing trigger generation in another embodiment.

The trigger generating process flow will be described below with reference to FIG. 14. In step S81, it is checked if the pen-tip switch is ON. If YES in step S81, an elapsed time signal is read from the timer 72 in step S82 to check if a time T has elapsed from the last trigger signal generation. If YES in step S82, a trigger generating process is executed in step S83, and the timer time is reset in step S84. Otherwise, no process is executed. The pen device 701 repeats the above-mentioned processes.

More specifically, once a trigger signal is generated by depressing the pen-tip switch, generation of the trigger signal upon depression of the pen-tip switch is inhibited until the time T elapses from the generation. When the pen-tip switch is depressed again after an elapse of the time T, the trigger signal is generated. In this embodiment, the time T is set to be several seconds.

The process after the trigger signal is supplied to the transfer code generator 3 is the same as that in the above embodiment.

In this manner, in addition to the effect of the above embodiment, the original process of the information processing apparatus can be avoided from being disturbed by frequent discrimination of a user, and power consumption of the pen device can be reduced.

As a generation method of a trigger signal, a method of generating a trigger signal at a predetermined period using only a timer, a method of generating a trigger signal when a special-purpose button provided to the pen device is depressed by a user, and the like are available.

Note that the present invention may be applied to either a system constituted by a plurality of devices, or an apparatus consisting of a single device. Also, the present invention may be applied to a case wherein the invention is achieved by supplying a program to the system or the apparatus.

What is claimed is:

1. An information processing system comprising:

an information input unit for inputting information; and an information processing unit for processing the information input by said information input unit, wherein said information input unit comprises:

memory means for storing a pass code assigned to said information input unit;

trigger generation means for generating a trigger signal;

timer means for measuring an elapse of a predetermined period of time; and transmission means for transmitting the pass code to said information processing unit in response to the trigger signal generated by said trigger generation means, wherein said trigger generation means generates the trigger signal at a time interval not less than the predetermined period of time measured by said timer means.

2. A system according to claim 1, wherein the pass code is uniquely assigned in correspondence with said information input unit.

3. A system according to claim 1, wherein said information input unit further includes switch means which is electrically connected/disconnected in response to a mechanical operation, and said trigger generation means generates the trigger signal in response to the electrical connection/disconnection of said switch means.

4. A system according to claim 1, wherein said transmission means performs transmission of a signal by radio.

5. An information input apparatus which inputs information and sends the input information to an information processing apparatus for processing the input information, said information input apparatus comprising:

memory means for storing a pass code assigned to said information input apparatus;

trigger generation means for generating a trigger signal;

timer means for measuring an elapse of a predetermined period of time; and transmission means for transmitting the pass code to the information processing apparatus in response to the trigger signal generated by said trigger generation means, wherein said trigger generation means generates the trigger signal at a time interval not less than the predetermined period of time measured by said timer means.

6. An information input apparatus according to claim 5, wherein the pass code is uniquely assigned in correspondence with said information input apparatus.

7. An information input apparatus according to claim 5, further comprising switch means which is electrically connected/disconnected in response to a mechanical operation, wherein said trigger generation means generates the trigger signal in response to the electrical connection/disconnection of said switch means.

8. An information input apparatus according to claim 5, wherein said transmission means performs transmission of a signal by radio.

9. An information processing apparatus which processes information received from an information input apparatus, wherein said information input apparatus comprises:

memory means for storing a pass code assigned to the information input apparatus;

trigger generation means for generating a trigger signal;

timer means for measuring an elapse of a predetermined period of time; and transmission means for transmitting the pass code to said information processing apparatus in response to the trigger signal generated by said trigger generation means, wherein said trigger generation means generates the trigger signal at a time interval not less than the predetermined period of time measured by said timer means, said information processing apparatus comprising:
   receiving means for receiving the information from the information input apparatus; and
   processing means for processing the information received by said receiving means.

10. An information processing apparatus according to claim 9, wherein the pass code is uniquely assigned in correspondence with the information input apparatus.

11. An information processing apparatus according to claim 9, wherein the information input apparatus further includes switch means which is electrically connected/disconnected in response to a mechanical operation, and said trigger generation means generates the trigger signal in response to the electrical connection/disconnection of said switch means.

12. An information processing apparatus according to claim 9, wherein the transmission means performs transmission of a signal by radio.

* * * * *

UNITED STATES PATENT AND TRADEMARK OFFICE
CERTIFICATE OF CORRECTION

PATENT NO. : 5,478,976
DATED : December 26, 1995
INVENTOR(S) : ATSUSHI KANO

It is certified that error appears in the above-indentified patent and that said Letters Patent is hereby corrected as shown below:

COLUMN 2

Line 44, "its" should be deleted.

COLUMN 4

Line 47, "steps 2 to 4," should read --steps S2 to S4,--;
Line 54, "step 3." should read --step S3.--;
Line 59, "step Si;" should read --step S7--;
Line 65, "Si," should read --S7,--.

COLUMN 5

Line 1, "Si" should read --S7,--.

Signed and Sealed this

Fourteenth Day of May, 1996

Attest:

BRUCE LEHMAN

*Attesting Officer*   *Commissioner of Patents and Trademarks*